United States Patent [19]

Dicoi et al.

[11] 4,361,538

[45] Nov. 30, 1982

[54] CONTINUOUS MOVING BED REACTOR FOR MANUFACTURE OF HIGH MOLECULAR WEIGHT POLYETHYLENE TEREPHTHALATE

[75] Inventors: Ovidiu Dicoi, Offenbach, Fed. Rep. of Germany; Ronald P. Wainberg, Lindfield, Australia

[73] Assignee: Davy International AG, Fed. Rep. of Germany

[21] Appl. No.: 244,658

[22] Filed: Mar. 17, 1981

[51] Int. Cl.³ .................. G01N 21/85; G05D 7/00; G05D 23/00; B01J 8/08
[52] U.S. Cl. .................. 422/62; 23/230 A; 260/695; 364/500; 422/109; 422/110; 422/131; 422/138; 422/232; 528/309
[58] Field of Search .................. 422/62, 110, 109, 131, 422/138, 232; 23/230 A; 260/695; 364/500; 528/309

[56] References Cited

U.S. PATENT DOCUMENTS

| | | | |
|---|---|---|---|
| 3,268,605 | 8/1966 | Boyd, Jr. | 422/110 X |
| 3,878,379 | 4/1975 | Moody, Jr. et al. | 528/309 X |
| 4,106,098 | 8/1978 | Moody, Jr. et al. | 528/309 X |

Primary Examiner—Michael S. Marcus
Attorney, Agent, or Firm—Allegretti, Newitt, Witcoff & McAndrews

[57] ABSTRACT

High molecular weight polyethylene terephthalate (PET) is obtained by solid state polycondensation of low molecular weight polymer granulate or chips. The present invention relates to a moving bed reactor wherein the crystallized, low molecular weight polymer granulate or chips move by gravity flow from the top to the bottom of a cylindrical, vertical reactor. By means of an automatic sampling system, samples of the polymer chips are taken from different points in the moving bed and analyzed to continuously establish the intrinsic viscosity, i.e. molecular weight, of the chips. A countercurrent flow of cold and/or heated gas and the chip residence time are then adjusted in response to the viscosity profile in the reactor in order to control and achieve a desired chip quality.

2 Claims, 1 Drawing Figure

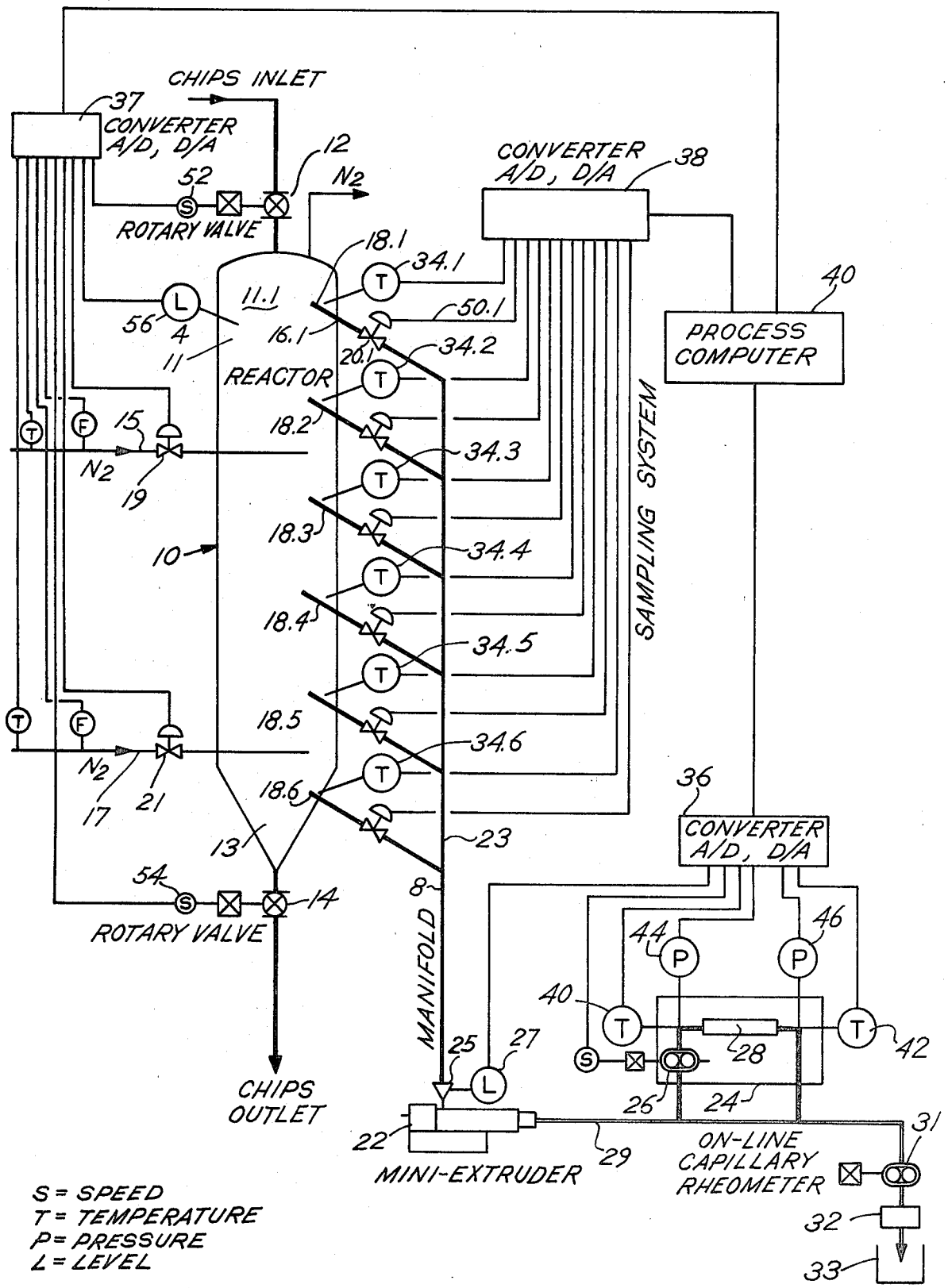

CONTINUOUS MOVING BED REACTOR FOR MANUFACTURE OF HIGH MOLECULAR WEIGHT POLYETHYLENE TEREPHTHALATE

BACKGROUND OF THE INVENTION

The control of molecular weight increase (which is directly related to intrinsic viscosity) during a solid state polycondensation process is important because variations of reaction vessel residence time, temperature, reaction products partial pressure, and gas oxygen content affect the quality of the final polymer. Also, an uncontrolled temperature profile within the reaction vessel or reactor can result in the formation of blocks of polymer material created by superficial melting and adhesion of polymer chips, a phenomena that leads to process shutdown.

Prior patents (Rothe et al, U.S. Pat. Nos. 4,064,112 and Herron, 4,161,578) disclose a fixed bed reactor for solid state polycondensation of polyethylene terephthalate chips. These references, however, do not advocate continuous monitoring of intrinsic viscosity and control of process parameters in response to the monitored values. Such monitoring may be desirable since variation from a specific intrinsic viscosity can result in the production of polymer chips which fail to meet specifications and which do not have the final desired polymer quality or character.

Though the variation of polycondensation rate is attributed primarily to a variation in chip size, initial polymer history, residence time, reactor geometry, temperature distribution, and partial pressure of ethylene glycol gas, in a fixed bed reactor, the primary means to vary the polycondensation rate is by varying the residence time in the reactor or by changing the gas flow rates and temperature in the reactor.

Previously it has been customary to obtain knowledge of the polycondensation rate by laboratory testing. However, difficulty is encountered using laboratory test procedures because of the very lengthy total time required to complete the tests. A conventional system may require of the order of from six to twelve hours, for example, between changing a process parameter and receiving the intrinsic viscosity test results. Also, even after testing it is difficult to determine whether chips will agglomerate and stick together thereby shutting down the reactor. The present invention seeks to overcome these difficulties in a continuous bed reactor.

SUMMARY OF THE INVENTION

Briefly this invention relates to an apparatus for continuous production of high molecular weight polyethylene terephthalate (PET) in a moving bed reactor, including means for monitoring the intrinsic viscosity of polymer chips in the reactor and also means for controlling the reactor parameters. The apparatus includes: (a) a continuous moving bed, polycondensation reactor; (b) an automatic sampling system in the reactor; (c) a continuous polymer chip melting system for melting the samples from the reactor; (d) an on-line rheometer for measuring the intrinsic viscosity of the sample polymer chips from the reactor; and (e) a process computer system responsive to the sampling system measurements to control various system parameters.

It is thus an object of the present invention to provide an improved polyethylene terephthalate formation reactor.

A further object of the invention is to provide a reactor which provides for vertical gravity flow of low molecular weight granulate or chips in an environment which will produce high quality PET material.

Another object is to provide a reactor for the formation of high quality PET material wherein the reactor includes a sampling system to continuously monitor the physical characteristics of the polymer chips along the length of the vertical reactor and to provide data for computer control of the environment within the reactor.

These and other objects, advantages and features of the invention will be set forth in the detailed description which follows.

BRIEF DESCRIPTION OF THE DRAWING

In the detailed description which follows, reference will be made to the drawing comprised of a single FIGURE which diagramatically illustrates the invention.

DESCRIPTION OF THE PREFERRED EMBODIMENT

General Description

The moving bed reactor consists of a vertical cylinder, or reaction vessel 10 with a preferred diameter of from about 0.3 to 2.5 meters and a preferred height of from about 3.0 to 12 meters. A bed of the polymer chips moves from the top 11 to the bottom 13 of the vessel 10 by gravity flow. A generally uniform temperature is maintained in each section of the vessel 10. Thus, an upper section 11.1 and each succeeding section 11.2, 11.3, 11.4, 11.5 and 11.6 will have a generally uniform reaction temperature. The speed of movement of the bed of chips inside the vessel 10 is controlled by means of a rotary inlet valve 12 and a rotary outlet valve 14.

An automatic sampling system is provided to remove samples of polymer chips from the vessel 10 at various intervals. The system includes one or more sampling locations 16.1 through 16.6 at vertically spaced points associated with each section 11.1 through 11.6 extending from the top 11 to the bottom 13 of the vessel 10. For example, sampling location 16.1 includes a line sampling pipe 18.1 projecting into vessel 10 and an associated control valve 20.1. Upon proper actuation by a computer command via control line 50.1, polymer chips inside of the vessel 10 flow by gravity through the associated sampling pipe 18.1 to a continuous melting device or extruder 22. A computer 40 controls the sampling time and sampling point (16.1, 16.2, 16.3, 16.4, 16.5, 16.6) by actuating control valves 20.1, 20.2, 20.3, 20.4, 20.5, 20.6. The automatic sampling system thus supplies a specific polymer sample to the extruder 22 via a manifold pipe 23.

The polymer chips are melted at between 280° C. to 285° C. in extruder 22. Typically extruder 22 has a screw length to diameter ratio of 20 and screw diameter of 22 mm. The extruder 22 thus destroys any trace of crystallinity and thereby provides for measurement of polymer parameters relevant to an extrusion process and thus suitable for feeding an on-line capillary rheometer 24.

The capillary rheometer 24 consists of a metering pump 26 which forces melted polymer through a capillary tube 28 having, for example, a length of 100 to 150 mm and diameter of 2 to 2.5 mm at a flow rate of 0.2 to 0.5 cubic centimeters/sec. The entire unit 24 which includes the pump 26 and the capillary tube 28 is heated.

Polymer melt from the extruder 22 at a pressure of approximately 40–50 atmospheres and 280° C.–285° C. flows into the metering pump 26 that is operated at a controlled speed, i.e., a variable shear rate as a function of the magnitude of the intrinsic viscosity. The temperature and pressure of the melted polymer is measured at the inlet and exit of the capillary tube 28 by sensors 40, 42, 44 and 46.

An isothermal flow of the melted polymer passes through the capillary tube 28. Isothermal conditions are effected by minimizing the difference between the inlet and outlet temperature as sensed by sensors 40, 42 merely by adjusting the speed of the metering pump 26. The apparent melt viscosity is computed as a ratio of shear stress to the shear rate which are calculated respectively from the pressure drop measurements in the capillary tube sensed by sensors 44, 46 and from the metering pump 26 flow rate as detected by sensor package 48. Then, the intrinsic viscosity (I.V.) is computed as a function of the relationship between apparent melt viscosity (M.V.) and melt temperature (T) according to the following formula:

$$IV = \exp(A + B/T + C \ln(MV))$$

or by any other equation which gives a proper correspondence between intrinsic viscosity (I.V.) and melt viscosity (M.V.). The progress of the polycondensation in the reaction vessel 10 is controlled by means of monitoring the increase in intrinsic viscosity (I.V.) of the polymer chips inside the moving bed reactor.

After a sampling cycle is computed, the intrinsic viscosity profile in the reactor or vessel bed and the reaction rate are computed as given in the following table:

| Sample Point | Temperature °C. | Residence Time h | Actual Intrinsic Viscosity | Reaction Rate $-dN/dt$ |
| --- | --- | --- | --- | --- |
| 16.1 | 221 | 0 | 0.528 | — |
| 16.2 | 226 | 2 | 0.588 | 8.17 |
| 16.3 | 225 | 4 | 0.635 | 4.53 |
| 16.4 | 225 | 6 | 0.644 | 2.53 |
| 16.5 | 223 | 8 | 0.680 | 2.17 |
| 16.6 | 225 | 10 | 0.705 | 1.75 | where N is the total number of end groups (OH+-COOH) calculated as follows:

$$N_{(OH + COOH)} = \frac{2 \times 10^6}{MW} \quad (equ/10^6 g)$$

$MW = A \, (IV)^B$
$MW$ = molecular weight
A, B—constants

The optimum intrinsic viscosity (I.V.) is calculated according to a feed-forward algorithm for any change in viscosity at the reactor inlet since the last cycle iteration. In accordance with this invention, process control is carried out so that the absolute intrinsic viscosity (I.V.) variation is smaller than 0.015 about each sample point.

Specific Example

Following is a specific example of the use of the apparatus described:

The following description relates to the drawing and the apparatus previously described. Polymer chips with a low viscosity suitable for solid state polycondensation enter the moving bed vertical cylindrical reactor vessel 10 through the rotary feeder valve 12 and after an appropriate residence time leave the reactor vessel 10 through the rotary valve 14 with the desired high viscosity. A solid state polycondensation process is carried out at various temperatures maintained by a countercurrent flow of nitrogen gas ($N_2$) supplied at different temperatures and flow rates. The gas ($N_2$) is fed through two gas distributor inlets 15 and 17 staggered along the height of the vessel 10. The gas flow rate is controlled by the control valves 19, 21 associated with inlets 15 and 17 respectively. The sampling system consists of six sampling tubes (18.1, 18.2, 18.3, 18.4, 18.5, 18.6) situated along the height of the vertical, cylindrical vessel 10. The sampling pipes 18 are inclined to permit the discharge of small chip samples by gravity through shut-off valve 20.1, for example, and manifold pipe 23. The chip samples are collected in a hopper 25 provided with a level indicator 27. From the hopper 25 the chips are continuously melted in the mini extruder 22.

The molten polymer then flows from mini extruder 22 through the main line 29 into the spinning pump 31 where it is spun in the spinneret 32, and collected in the storage bin 33.

The on-line capillary rheometer 24 consists of a variable speed metering pump 26, a capillary tube 28 and a heating system. The output data from the viscosity metering unit 24 as well as the sample temperature from temperature sensors 40, 42, the pressure sensors 44, 46, the level sensor 56, parameters for the gas flowing through valves 19, 21, and rotary valve speed sensors 52, 54 are converted to digital form by converters 36, 37, 38 and supplied to a process computer 40. The computer 40 output also provides control signals through the converters 36, 37, 38 and then to the various control points in the system particularly the rotary valves 12, 14 and gas valves 19, 21.

According to the polymer viscosity measurements at different levels of the reactor, continuous dynamic control of gas flow rate to the various distribution points and the residence time within the reactor is carried out by the process computer 40.

By means of a pre-programmed sampling cycle the valves (20.1, 20.2, 20.3, 20.4, 20.5, 20.6) are opened and closed alternatively, thereby permitting continuous monitoring of the product viscosity profile within the vessel 10. The level indicator 27 on the hopper 25 insures that the correct time delay is effected before a representative viscosity reading is obtained. Should the level indicator 27 show the hopper 25 to be empty and the pressure falls below a minimum value, the sample cycle is continued automatically.

The apparatus comprising a moving bed reactor for continuous solid state polycondensation of polyester terephthalate granulate provided with an automatic monitored sampling control system consisting of one or more sampling pipes located from the top to the bottom of the vertical reactor, a continuous chip melting device, an on-line rheometer and a process computer offers the following advantages:

(1) continuous monitoring of the quality of high molecular weight polymer obtained by solid state polycondensation within a moving bed reactor, (2) continuous control of solid state polycondensation rate and process parameters including temperature, gas flow rate and residence time as a function of the desired longitudinal distribution of polymer viscosity within the reactor, (3) process control whereby the solid state polycondensation parameters are optimized as a function of feed quality (viscosity, chip size, etc.) and the desired end product quality, (4) data acquisition for designing solid state polycondensation reactors for high molecular weight polymers, and (5) process control for monitoring the production of high molecular weight polymers which eliminates the risk of producing an unspecified end product.

Thus, while a preferred embodiment is disclosed, the invention is to be limited only by the following claims and their equivalents.

What is claimed is:

1. Apparatus for continuous manufacture of polyethylene terephthalate comprising in combination:
   (a) a vertical, cylindrical reactor vessel having an upper end inlet, a lower end outlet for polymer chips and means adapted for feeding polymer chips to said inlet;
   (b) a plurality of vertically spaced sample tubes connected to and communicating with the interior of the reactor vessel for the collection of polymer chip samples;
   (c) a manifold pipe connected to each of the sample tubes;
   (d) means for continuously measuring the apparent melt viscosity of the polymer chips collected from the sample tubes and generating a corresponding first signal, said manifold pipe connecting said means for measuring the apparent melt viscosity with the sample tubes;
   (e) means for controlling the delivery of polymer chip samples from the sample tubes to the means for measuring the apparent melt viscosity such that the apparent melt viscosity of not more than one polymer chip sample is measured at any given time;
   (f) means for measuring the temperature of the reactor vessel at each of the sample sites and for generating a corresponding second signal;
   (g) means defining at least one gas source connected to the reactor vessel at the lower end thereof for the introduction of countercurrent flow of cold and/or heated gas to vary the temperature within the reaction vessel;
   (h) means for measuring the flow rate of polymer chips through the reactor and for generating a corresponding third signal; and
   (i) control means that receive the first signal corresponding to apparent melt viscosity, the second signal corresponding to the temperature of the reactor vessel at each of the sample sites, and the third signal corresponding to flow rate of the polymer chips within the reactor vessel, said control means providing appropriate first output control signals to the upper end inlet and the lower end output to vary the flow rate of polymer chips within the reactor vessel, and said control means also providing appropriate second output control signals to control the flow of gas from the gas source and thereby vary the temperature within the reactor vessel, thereby providing a known character and output of polymer from the reactor.

2. The apparatus of claim 1 wherein the means for measuring apparent melt viscosity includes a capillary rheometer having a variable speed metering pump directing sample polymer to a capillary tube, means to keep the flow through the tube isothermal, pressure sensors at opposite ends of the tube and means for controlling the metering pump speed in response to the isothermal flow means.

* * * * *